US012134061B2

(12) United States Patent
Alagouda et al.

(10) Patent No.: US 12,134,061 B2
(45) Date of Patent: Nov. 5, 2024

(54) FILTER SYSTEM HAVING A PRIMARY AND A SECONDARY FILTER ELEMENT AND SECONDARY FILTER ELEMENT FOR SUCH A FILTER SYSTEM

(71) Applicant: MANN+HUMMEL GmbH, Ludwigsburg (DE)

(72) Inventors: Bharatesh Alagouda, Karnataka (IN); Pascal Neef, Trossingen (DE); Joachim Schuldt, Ludwigshafen (DE); Deepthi Burugina Raviprakash, Bangalore (IN); Mridul Sharma, Bangalore (IN)

(73) Assignee: MANN+HUMMEL GmbH, Ludwigsburg (DE)

( * ) Notice: Subject to any disclaimer, the term of this patent is extended or adjusted under 35 U.S.C. 154(b) by 381 days.

(21) Appl. No.: 17/562,319

(22) Filed: Dec. 27, 2021

(65) Prior Publication Data

US 2022/0118397 A1   Apr. 21, 2022

Related U.S. Application Data

(63) Continuation of application No. PCT/EP2020/067180, filed on Jun. 19, 2020.

(30) Foreign Application Priority Data

Jun. 27, 2019   (EP) .................................... 19182956

(51) Int. Cl.
*B01D 46/64* (2022.01)
*B01D 46/00* (2022.01)
*B01D 46/24* (2006.01)

(52) U.S. Cl.
CPC ......... *B01D 46/64* (2022.01); *B01D 46/0005* (2013.01); *B01D 46/2414* (2013.01);
(Continued)

(58) Field of Classification Search
CPC .............. B01D 46/64; B01D 2265/026; B01D 46/2414; B01D 46/0005; B01D 2265/06;
(Continued)

(56) References Cited

U.S. PATENT DOCUMENTS 7,828,870 B1   11/2010   Rech et al.
9,346,001 B2   5/2016   Kato et al.
(Continued)

FOREIGN PATENT DOCUMENTS

EP   3470129 A1   4/2019

*Primary Examiner* — Robert Clemente

(57) ABSTRACT

A filter system (100) having a housing (110), a fluid inlet (102) formed in a housing wall (112), a fluid outlet (108) formed in a housing wall (120), a primary filter element (50) and a secondary filter element (10). The secondary filter element (10) is arranged on a stand pipe (150) rigidly connected to one of the housing walls (120). The secondary filter element (10) includes a filter medium (16) forming a body (36) having at least one longitudinal seam (18) along a longitudinal axis (L) and an end cap (20) at its top region (12). The secondary filter element (10) and the stand pipe (150) are mutually connected by connection elements (22, 156). The secondary filter element (10) and the stand pipe (150) are configured with mutual self-positioning elements (30, 180) to arrange the secondary filter element (10) in a defined rotational position with respect to one or more struts (170).

14 Claims, 11 Drawing Sheets

(52) U.S. Cl.
CPC .. *B01D 2265/026* (2013.01); *B01D 2265/028* (2013.01); *B01D 2265/06* (2013.01)

(58) Field of Classification Search
CPC ............ B01D 2265/021; B01D 46/521; F02M 35/0214; F02M 35/0216
See application file for complete search history.

(56) References Cited

U.S. PATENT DOCUMENTS

| | | |
|---|---|---|
| 10,413,855 B2 | 9/2019 | Nelson et al. |
| 2004/0031748 A1 | 2/2004 | Kochert et al. |
| 2009/0100813 A1* | 4/2009 | Iddings .................. B01D 46/64 |
| | | 55/498 |
| 2012/0067017 A1 | 3/2012 | Baseotto et al. |
| 2014/0144111 A1 | 5/2014 | Campbell et al. |
| 2015/0082982 A1* | 3/2015 | Ruhland ................ B01D 46/64 |
| | | 55/510 |
| 2016/0296868 A1 | 10/2016 | Stark et al. |
| 2016/0296869 A1 | 10/2016 | Stark et al. |
| 2018/0036667 A1 | 2/2018 | Neef et al. |
| 2018/0339253 A1* | 11/2018 | Karlsson ............ B01D 46/0005 |
| 2019/0015770 A1 | 1/2019 | Scott et al. |
| 2019/0299143 A1 | 10/2019 | Decoster et al. |

* cited by examiner

FILTER SYSTEM HAVING A PRIMARY AND A SECONDARY FILTER ELEMENT AND SECONDARY FILTER ELEMENT FOR SUCH A FILTER SYSTEM

CROSS REFERENCE TO RELATED APPLICATIONS

This application is a continuation application of international application No. PCT/EP2020/067180 having an international filing date of 19 Jun. 2020 and designating the United States, the international application claiming a priority date of 27 Jun. 2019 based on prior filed EPO patent application No. EP 19182956.3, the entire contents of the aforesaid international application and the aforesaid EPO patent application being incorporated herein by reference to the fullest extent permitted by the law.

TECHNICAL FIELD

The invention relates to a filter system having a primary and a secondary filter element and a secondary filter element for such a filter system, in particular for an air filter system of an internal combustion engine.

BACKGROUND

It is known to use air filters in order to control combustion intake air for internal combustion engines in passenger vehicles, commercial vehicles, work machines, agricultural vehicles, but also stationary generators and the like. Such air filters generally comprise a housing, an air inlet, and an air outlet, with a removable and replaceable main or primary filter element disposed within the housing. The housing often includes a maintenance cover for access to the filter element inside the housing during maintenance. For this purpose, the filter element can be removed and either replaced by a new filter element, overtaken and reused, or replaced by a previously used, but overtaken filter element.

The filter elements of air filters are usually replaced after a certain operating time. Depending on the dust load on the filter element during usage, the service life of a filter can be several days, for example when used in construction machines, up to several months in a less dusty environment.

In particular in the case of frequent exchanges of filter elements, reliable and process-proof sealing of the filter element in a housing is important. The sealing should be temperature resistant and vibration tested. The sealing of the filter element must also be ensured on systems or devices which are exposed to strong vibrations. At the same time, however, the filter element itself should preferably not have any metallic elements, so that it can be disposed of thermally without problems. In order to protect the clean side of an air cleaner system of an internal combustion engine against penetrating dirt particles when replacing the main filter element, a so-called "secondary filter element" is used, which remains in the filter housing during replacement of the primary filter element. The secondary filter element is usually located on the clean side of the filter element, for example inside the primary filter element, and is connected to the housing of the filter system. The secondary filter element itself also has a filter medium which keeps residual dirt particles away from the filter outlet in the air stream.

Optionally, the secondary filter element itself can be exchanged as it can be loaded with dust particles. The lifetime of the secondary filter element, however, is much longer than the lifetime of the primary filter element.

U.S. Pat. No. 8,480,778 B2 discloses an air filter system in which a secondary filter element is disclosed which consists of a filter medium configured as a hollow cylinder which is closed at one side by a closed end cap and is open at the other end. With the open end it can be slipped over a support tube connected to the filter housing, thus protecting the outlet of the filter system against dirt particles. The primary filter element rests on the free end of the supporting tube and thus on the end cap of the secondary filter element. The primary filter element is mounted on the secondary filter element. Other air filter systems are known from US 2018/036667 A1 or WO 2018/111434 A2.

SUMMARY OF THE INVENTION

It is an object of the invention to provide a filter system for accommodating a secondary filter element which ensures a defined flow characteristic of the fluid so that a mass flow sensor in the filter system has reliable operating conditions.

It is a further object of the invention to provide a secondary filter element for such a filter system.

The aforementioned object is achieved according to one aspect of the invention by a filter system comprising a housing, a fluid inlet and a fluid outlet each formed in a housing wall, a primary filter element and a secondary filter element, the secondary filter element being arranged downstream the primary filter element on a stand pipe, the stand pipe being rigidly connected to one of the housing walls, the inside of the stand pipe being in fluid connection with the fluid outlet, wherein the secondary filter element comprises a filter medium forming a body having at least one longitudinal seam along a longitudinal axis, wherein the secondary filter element comprises an end cap at its top region, wherein the secondary filter element and the stand pipe are mutually connected at one of their top regions by connection elements, and wherein the secondary filter element and the stand pipe are configured with mutual self-positioning elements to arrange the secondary filter element on the stand pipe in a defined rotational position with respect to one or more struts of the stand pipe, as well according to another aspect of the invention by a secondary filter element for such a filter system.

Advantageous embodiments and advantages of the invention are described in the further claims, the description and the drawings.

According to a first aspect of the invention, a filter system is proposed comprising a housing, a fluid inlet formed in a housing wall, a fluid outlet formed in a housing wall, a primary filter element and a secondary filter element, both being accommodated in the housing. The secondary filter element is arranged downstream the primary filter element on a stand pipe. The stand pipe is rigidly connected to one of the housing walls, the inside of the stand pipe being in fluid connection with the fluid outlet. The secondary filter element comprises a filter medium forming a body having at least one longitudinal seam. The secondary filter element comprises an end cap at its top region. The secondary filter element and the stand pipe are mutually connected at one of their top regions by connection elements. The secondary filter element and the stand pipe are configured with mutual self-positioning elements to arrange the secondary filter element on the stand pipe in a defined rotational position with respect to one or more struts of the stand pipe.

According to one preferred embodiment, a first axial end of the stand pipe is connected to the housing wall and the opposite, second axial end of the stand pope defines the top region of the stand pipe. Preferably, the connection elements of the stand pipe are positioned at the top region of the stand pipe. It is further preferred that the one or more connection elements of the secondary filter element are provided on the secondary filter element end cap such that secondary filter element and stand pipe can be mutually connected by connecting the connection elements provided on the end cap and on the stand pipe.

Advantageously, by connecting the stand pipe rigidly with the bottom wall of the housing, the positions of the longitudinal struts are known. By positioning the secondary filter element in a distinct rotational orientation with respect to one or more struts of the stand pipe, disturbances of the flow characteristic due to one or more longitudinal seams of the filter medium can be reduced or eliminated. The seam can be positioned radially in front of one particular strut or, alternatively, between two longitudinal struts. As a result, the position of the seam or seams of the secondary filter element on the stand pipe is known too. In a preferred air filter system for a combustion engine this allows to position the longitudinal struts of the stand pipe and the seam of the secondary filter element with respect to a mass flow sensor in a way that the flow characteristics of the fluid, i.e. air, is known in the region of the mass flow sensor and the measurements of the mass flow sensor are accurate. The mutual self-positioning elements of the secondary filter element and the stand pipe enable a defined position of the longitudinal seam of the filter medium of the secondary filter element. As result a flow-disturbing influence of the longitudinal seam on the flow characteristics can be reduced or even eliminated. Additionally a reproducible position of the seam or seams with respect to a mass flow sensor can be achieved in case the secondary filter element is exchanged.

Moreover, a further advantage of such a filter system is the safe and stable assembly of both the primary filter element and the secondary filter element, as well as a very economical interchangeability of the primary filter element and, if appropriate, of the secondary filter element in the event of maintenance.

The filter medium of the secondary filter element may be formed from a nonwoven or from paper or cellulose or from a mixed fiber of plastic and cellulose. A material suitable for the intended purpose of use can be selected. Advantageously, the filter medium can be designed endlessly on the circumference of the secondary filter element with at least one longitudinal seam. Planar surfaces of filter media can be used for the production of the secondary filter element, which are wound onto a corresponding shaped body and closed by welding the open ends along a longitudinal seam, for example, whereby the tightness of the secondary filter element is achieved.

According to a favorable embodiment, the mutual self-positioning elements may comprise a guiding surface and a projection element, wherein the guiding surface is intended to guide the projection element from an initial position to a final position where the secondary filter element is in its defined rotational position with respect to the one or more struts of the stand pipe. Appropriate pairs of mutual self-positioning elements can be chosen.

According to a favorable embodiment, the mutual self-positioning elements may comprise a contour arranged at an exterior surface of one of the stand pipe and the secondary filter element and a counter contour at an interior surface of the other one of the stand pipe and the secondary filter element. Favorably, a polygonal contour on the stand pipe can be used for mounting the stand pipe to the bottom wall of the housing in a position oriented manner. Dual use can be made of such a contour for aligning the secondary filter element on the stand pipe, too, when an appropriate counter contour is provided on the secondary filter element.

According to a favorable embodiment, the top region of the stand pipe may comprise a receptacle for accommodating the end cap of the secondary filter element, the receptacle having a bottom segment and a top segment along the longitudinal axis. The receptacle can have a shape complementary to the end cap of the secondary filter element for reliably connecting the two components.

According to a favorable embodiment, the end cap of the secondary filter element may be configured with a recess intended to extend into the interior of the stand pipe, in particular where the recess extends inside the receptacle towards the bottom segment. This allows to provide safe and reliable assembly of the secondary filter element and the stand pipe. In particular, the bottom segment may provide at least one mutual self-positioning element and the top segment may be free of the at least one mutual self-positioning element. Advantageously, the end cap can at least partly immerse into the top segment without making contact with the self-positioning element in the receptacle and safely be guided into its final position.

According to a favorable embodiment, the top segment of the receptacle may have a depth in the receptacle which is equal to or larger than a longitudinal clearance of the longitudinal outermost face of the projection element. Favorably, the end cap can be introduced into the receptacle and move into its final position without tilting in the receptacle. In particular, the connection elements of the end cap can be inserted without getting stuck in the receptacle.

According to a favorable embodiment, the connection elements for connecting the secondary filter element and the stand pipe may comprise snap-fit elements, in particular one or more snap beams and a locking element for the snap beams. A reliable connection can be established. The dimensions of the components can easily be adapted to the needs of the actual filter system.

According to a favorable embodiment, a length of the snap beams may be adjusted to a longitudinal extension of the receptacle so that the connection elements of the secondary filter element and the stand pipe connect when or after the projection element has reached its final position. As a result, the rotational position as well as the axial position of the secondary filter element on the stand pipe can be secured in one joint mounting procedure.

According to a favorable embodiment, the guiding surface comprises at least one preferably spiral ramp surface. Preferably, the guiding surface comprises two spiral ramp sections, both extending from a top position to the minimum axial position in counter rotating directions.

According to a favorable embodiment, a pocket may be arranged in the guiding surface for receiving the projection element when the secondary filter element is in or close to its final position. A reliable fixation of the projection element can be reached.

According to a favorable embodiment, a notch is arranged in the guiding surface for receiving the projection element when the secondary filter element is in its final position. A reliable fixation of the projection element can be reached. Removing the secondary filter element from the stand pipe is facilitated.

According to a further aspect of the invention a secondary filter element for the inventive filter system is proposed, with a filter medium forming a body with at least one longitudinal seam, in particular weld seam, along a longitudinal axis and an end cap at its top region. The end cap is provided with one or more connection elements which are intended to connect the secondary filter element to a stand pipe of the filter system. The end cap is provided with a self-positioning element to arrange the secondary filter element on the stand pipe of the filter system in a defined rotational position with respect to one or more struts of the stand pipe of the filter system.

Favorably, the secondary filter element can have a conical shape and its diameter taper from the open end towards the closed end. This facilitates the assembly of the secondary filter element onto the stand pipe. Advantageously, the connection elements can comprise a part of a snap fit connection. Thus, the connection elements can comprise snap beams and a counter-member on the stand-pipe side, on which the snap beams hooks can be hooked. An inverse configuration is likewise possible.

According to a favorable embodiment, the end cap of the secondary filter element may have a pot-like shape and the self-positioning element extends into the interior of the secondary filter medium. A reliable connection to and positioning in the stand pipe of the filter system is possible.

According to a favorable embodiment, the end cap can be firmly connected to the filter medium, in particular welded or glued or sprayed or foamed. A type of connection suitable for the intended application can be selected.

According to a favorable embodiment, the end cap may be provided with a projection element extending in axial direction. The projection element can be used as a self-positioning element when mounting the secondary filter element on the stand pipe of the filter system. In particular, the projection element may be arranged eccentrically on the end cap with respect to a centre axis of the end cap. The centre axis may be the longitudinal axis of the secondary filter element. The projection element can be used as a means to guide the movement of the end cap and thus the secondary filter element during assembly on the stand pipe which preferably provides a guiding surface extending radially into the receptacle of the stand pipe.

Advantageously, the inventive filter system and secondary filter element can be used as an air filter, in particular as an air filter of an internal combustion engine. The safe operation of internal combustion engines is also based on safe and favorable filtering of the intake air for combustion operation, in particular with an undisturbed flow characteristic of the air at the mass flow sensor. The described filter system represents an economic and reliable possibility for this purpose. The use of the filter system as a particle filter, in particular as a particle filter of an internal combustion engine, is also advantageous. Again, the secure assembly and economic interchangeability of the described filter elements is of advantage. Conveniently, the secondary filter element may remain in the housing when the primary filter element is changed. This ensures that the clean side of the filter system is also effectively protected against penetrating dirt particles during maintenance of the filter system.

It is to be understood that the invention can be combined with one or more of the features disclosed in the patent applications with the title "Filter system having a primary and a secondary filter element and secondary filter element for such a filter system" and "Filter system having a primary and a secondary filter element and primary filter element for such a filter system" all filed by the applicant together with this patent application at the same day

BRIEF DESCRIPTION OF THE DRAWINGS

Further advantages result from the following drawing description. Embodiments of the invention are shown in the drawings. The drawings, the description, and the claims contain numerous features in combination. The person skilled in the art will expediently also consider the features individually and combine them into sensible further combinations. For example.

DETAILED DESCRIPTION

Figure 1:
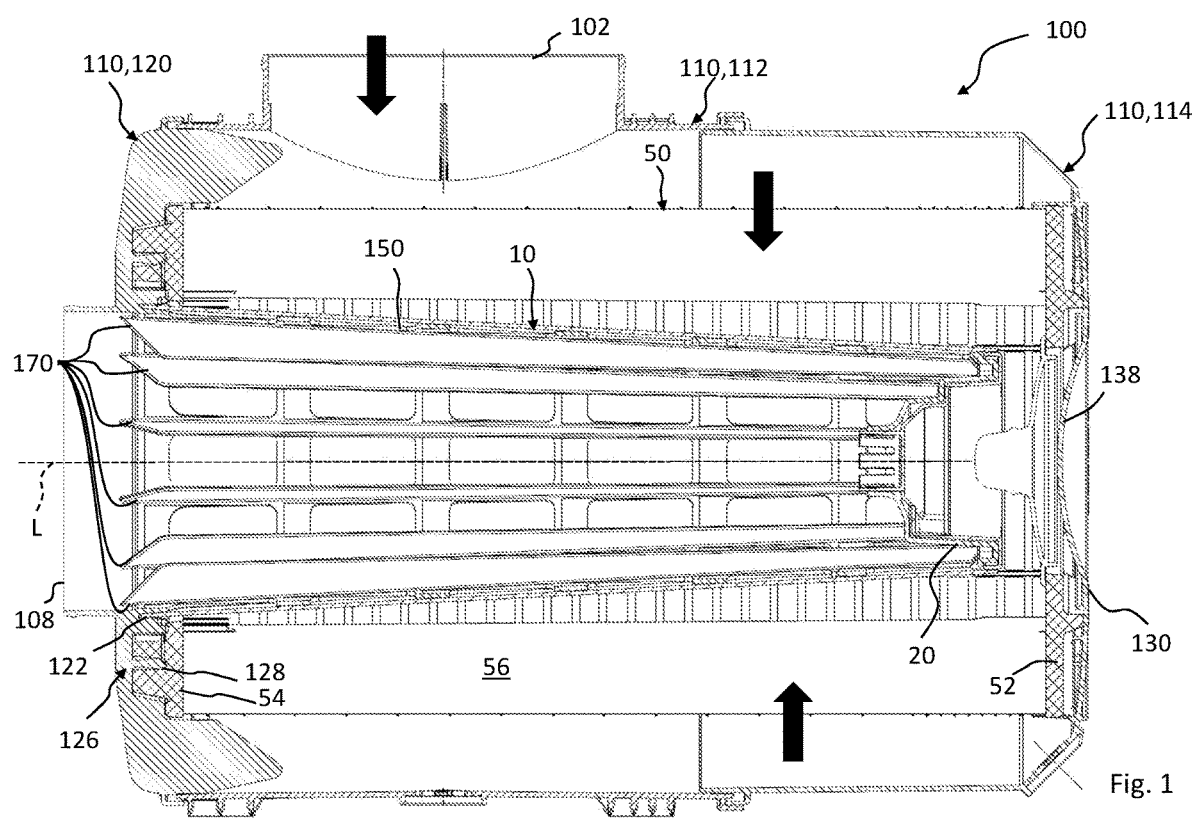
FIG. 1 shows a longitudinal cut view of a filter system according to an embodiment of the invention.

The figures show merely examples and are not intended to be limiting. Similar or equal elements are referred to with same reference numerals in the Figures.

Figure 2:
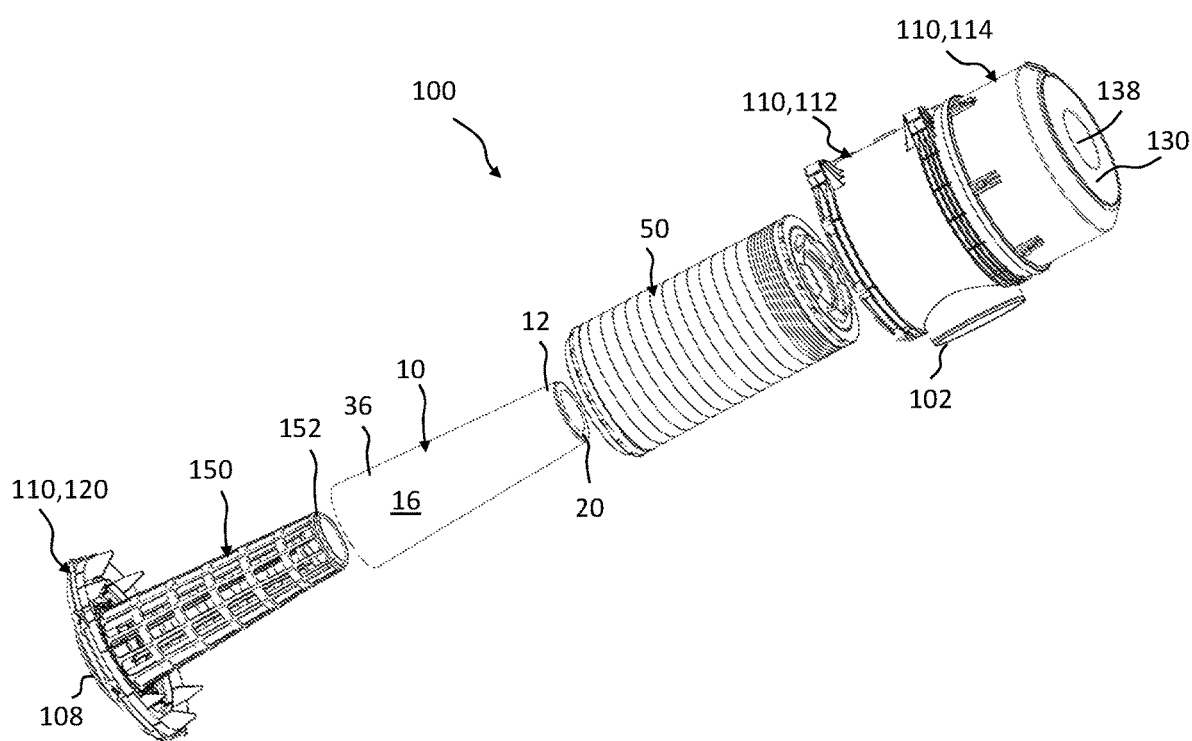
FIG. 2 shows the filter system of FIG. 1 in an exploded view.

FIG. 1 shows a longitudinal cut view of a filter system 100 according to an embodiment of the invention. FIG. 2 shows the filter system 100 of FIG. 1 in an exploded view.

The filter system 100 comprises a housing 110, a fluid inlet 102 formed in a housing wall 112, a fluid outlet 108 formed in a bottom housing wall 120. In this embodiment, the housing 110 may consist of three segments, the bottom housing wall 120, the intermediate ring-shaped housing wall 112 with the fluid inlet 102 and a cover part 114. The segments are connected to each other by, e.g., clamps or the like. A hollow cylindrical primary filter element 50 is accommodated in the housing 110. For removing the primary filter element 50 for maintenance or exchange the housing walls 112, 114 can be removed from the bottom housing wall 120 together in one piece or only the cover part 114 is removed.

The body of the primary filter element 50 is made of a filter medium 56 which may be pleated, for instance. The primary filter element 50 is covered at both ends by ring shaped end plates 52, 54, which are made, for example, from polyurethane which is well known in the prior art. Sealing structures and supporting ribs are arranged at the exterior sides of the end plates 52, 54. The primary filter element 50 is clamped between the bottom wall 120 and the cover 114 in a sealing tight manner so that a fluid has to pass through the primary filter element 50 in a radial direction, which is indicated by bold arrows in FIG. 1. The endplate 54 of the primary filter element 50 is accommodated in the bottom housing wall 120 which is provided with a groove 126. For radial fixation of the primary filter element 50, a ring shaped projection 128 is arranged in the groove 126.

In its front face 130, the cover part 114 is provided with a recess 138 which extends into the interior of the housing 110.

Inside the primary filter element 50 a secondary filter element 10 is arranged. The primary and secondary filter elements 50, 10 are arranged concentrically about an axis in longitudinal direction L. The secondary filter element 10 is arranged downstream the primary filter element 50 so that fluid has to pass through the secondary filter element 10 on its way to the fluid outlet 108. The secondary filter element 10 is arranged on a stand pipe 150 which is rigidly connected to the bottom housing wall 120. The lower part of the stand pipe 150 merges with the fluid outlet 108 of the bottom housing wall 120. The secondary filter element 10 comprises a filter medium 16 forming a body 36 with at least one weld seam 18 along the longitudinal direction L.

The secondary filter element 10 comprises a closed end cap 20 at its top region 12, wherein the secondary filter element 10 and the stand pipe 150 are mutually connected at their top regions 12, 152 by connection elements. The open ended side of the secondary filter element 10 is accommodated in a circular groove 122 in the bottom wall 120.

Figure 3:
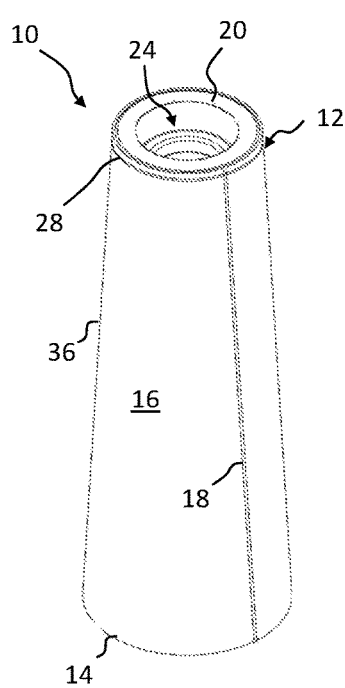
FIG. 3 shows a first embodiment of a secondary filter element with an end cap having a recess at its exterior side.

FIG. 3 shows a first embodiment of a secondary filter element 10 with an end cap 20 having a recess 24 at its exterior side. The secondary filter element 10 has a body 36 consisting of a filter medium 16. The filter medium 16 can be a nonwoven material, paper, cellulose or a mixed fiber of plastic and cellulose. The filter medium 16 can be designed endlessly on the circumference of the secondary element 10 with at least one longitudinal weld seam 18. The filter body 36 formed thereof has a conical shape with a large diameter at a bottom side 14 and a smaller diameter at the top region 12 of the body 36 where the end cap 20 is mounted. Preferably the filter medium 16 is connected to the end cap 20 by way of a circumferential weld seam 28. The recess 24 in the end cap 20 extends into the interior of the body 36.

Figure 4:
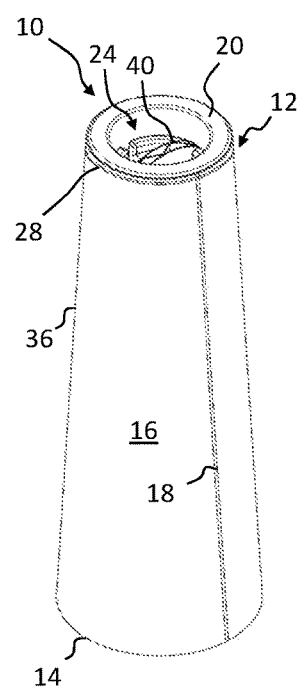
FIG. 4 shows a second embodiment of a secondary filter element with an end cap having a knob at its exterior side.

FIG. 4 shows a second embodiment of a secondary filter element 10 with an end cap 20 having a knob 40 at its exterior side. The secondary filter element 10 has a body 36 consisting of a filter medium 16. The filter medium 16 can be a nonwoven material, paper, cellulose or a mixed fiber of plastic and cellulose. The filter medium 16 can be designed endlessly on the circumference of the secondary element 10 with at least one weld seam 18 in longitudinal direction. The filter body 36 formed thereof has a conical shape with a large diameter at a bottom side 14 and a smaller diameter at the top region 12 of the body 36 where the end cap 20 is mounted. Preferably the filter medium 16 is connected to the end cap 20 by way of a circumferential weld seam 28. The recess 24 in the end cap 20 extends into the interior of the body 36. The recess 24 houses the knob 40 which spans the recess 24 in a bridge-like manner. The knob 40 can be used for mounting the secondary filter element 10 onto the stand pipe 150 as well as for demounting the secondary filter element 10 from the stand pipe 150. By turning the secondary filter element 10 about its longitudinal axis the secondary filter element 10 can be mounted, by turning the knob 40 in the opposite rotational direction the secondary filter element 10 can be removed from the stand pipe 150.

Figure 5:
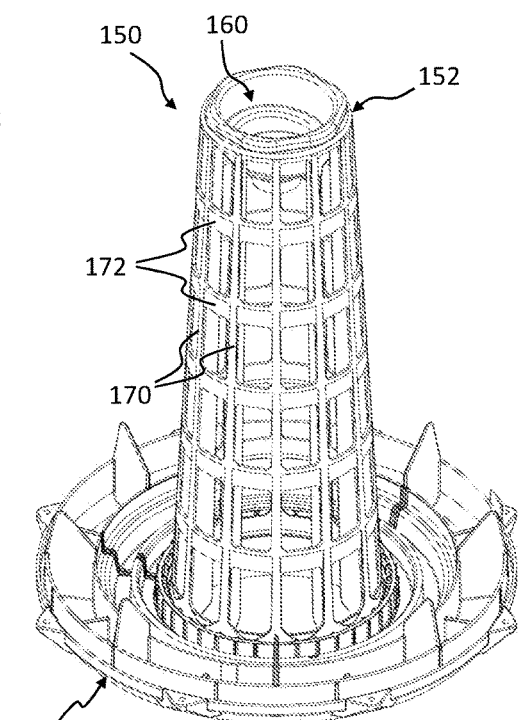
FIG. 5 shows a bottom wall of a housing of a filter system with a stand pipe attached to the bottom wall.

FIG. 5 shows a bottom wall 120 of a housing 110 of a filter system 100 with a stand pipe 150 attached to the bottom wall 120. The lattice-like body of the stand pipe 150 is conically shaped and composed of longitudinal struts 170 and circumferential struts 172, only two of each are referred to with reference numerals for clarity reasons.

The stand pipe 150 is provided as a carrier of the secondary filter element 10 as shown in FIGS. 3 and 4. The secondary filter element 10 and the stand pipe 150 each comprise complementary connecting means with which they can be connected to one another at one of their end faces, shown on top in the FIGS. 3 to 5. This allows for a safe and stable assembly of both the primary filter element 50 (FIGS. 1, 2) and the secondary filter element 10, as well as a very economical interchangeability of the primary filter element 50 and, if appropriate, of the secondary filter element 10 in the event of maintenance. The secondary filter element 10 rests firmly on the stand pipe 150. Due to the closed end cap 20 of the secondary filter element 10, even with dismounted primary filter element 50 the clean side of the filter system 100 is protected against particulate matter even if fluid is still sucked through the secondary filter element 10.

FIGS. 6 to 10 illustrate a first embodiment of a secondary filter element 10 with a closed end cap 20 according to FIG. 3 in more detail.

Figure 6:
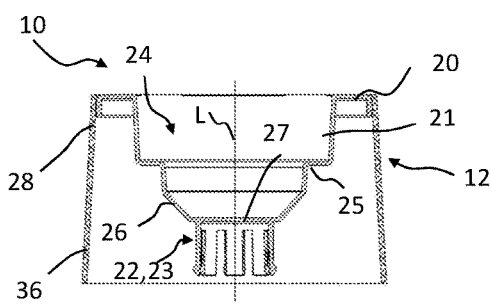
FIG. 6 shows a longitudinal cut view of a top region of the secondary filter element according to FIG. 3.
Figure 7:
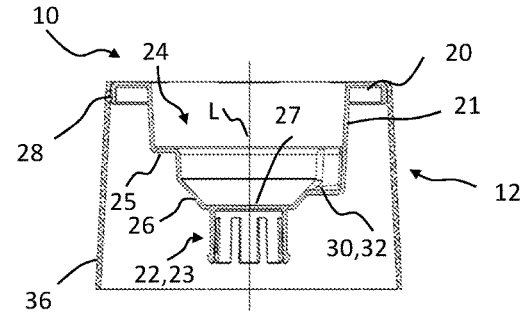
FIG. 7 shows another longitudinal cut view of the top region of the secondary filter element according to FIG. 3.
Figure 8:
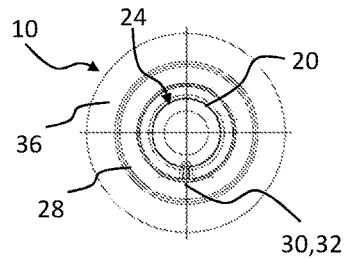
FIG. 8 shows a top view of the secondary filter element according to FIG. 3.
Figure 9:
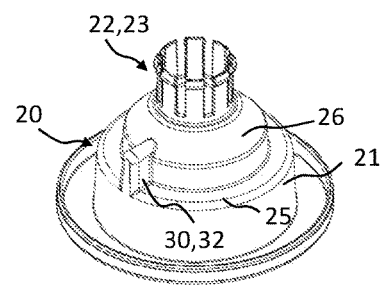
FIG. 9 shows an isometric view of the interior side of the end cap of the secondary filter element according to FIG. 3.
Figure 10:
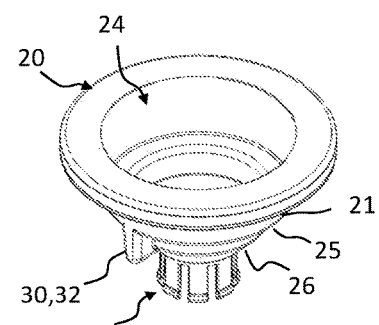
FIG. 10 shows an isometric view of the exterior side of the end cap of the secondary filter element according to FIG. 3.

FIGS. 6 to 8 show a top region 12 of the secondary filter element 10 with the end cap 20 in different views where FIG. 6 shows a longitudinal cut view, FIG. 7 shows a longitudinal cut view of the top region 12 rotated by 90° about the longitudinal direction and FIG. 8 shows a top view of the secondary filter element 10. FIG. 9 shows an isometric view of the interior side of the end cap 20 of the secondary filter element 10 and FIG. 10 shows an isometric view of the exterior side of the end cap 20.

The end cap 20 of the secondary filter element 10 is configured with a recess 24 having a closed bottom region 26 which extends into the interior of the body 36 of the secondary filter element 10. The body 36 consists of a filter medium which is attached to a flange of the end cap 20 at a circumferential seam 28 by, e.g. welding, glueing or the like.

The end cap 20 has a pot-like shape comprising two segments, an upper segment 21 with a larger diameter carrying the flange and the bottom segment 26 with a smaller diameter. As can be seen in FIGS. 7-10, the upper segment 21 and the lower segment 26 are annular. The bottom segment 26 is spaced radially inwardly away from the annular upper segment 21. At the interface between the upper segment 21 and the bottom segment 26, a step 25 is formed due to the different diameters of the segments 21, 26. As shown in FIG. 9, the step 25 is annular and closes a radial gap between the upper segment 21 and the bottom segment 26. The bottom segment 26 shows a conical part at the interface and a tapered part towards the closed bottom 27. At the outside of the bottom 27 connection elements 22, embodied as, e.g., snap beams 23, extend further in longitudinal direction. The connection elements 22 are intended to cooperate with corresponding one or more connection elements of the stand pipe 150.

In the recess 24 a self-positioning element 30 is arranged, embodied, e.g., as a projection element 32. The projection element 32 extends from the step 25 at the interface between the upper segment 21 and the bottom segment 26 towards the beginning of the tapered section of the bottom segment 26. When seen from the top of the end cap 20, the projection element 32 forms a depression in the step 25 between the upper segment 21 and the bottom segment 26 and may be open towards the bottom segment 26.

The end cap 20 is intended to extend into the interior of the stand pipe 150 (FIG. 5). In particular the recess 24 of the end cap 20 extends inside a receptacle 160 of the stand pipe 150. In a mounted position of the secondary filter element 10 on the stand pipe 150, the connection elements 22 cooperate with counter elements 156 for axial connection while the self-positioning element 30 (projection element 32) cooperates with a counter self-positioning element 180 of the stand pipe 150.

Figure 11:
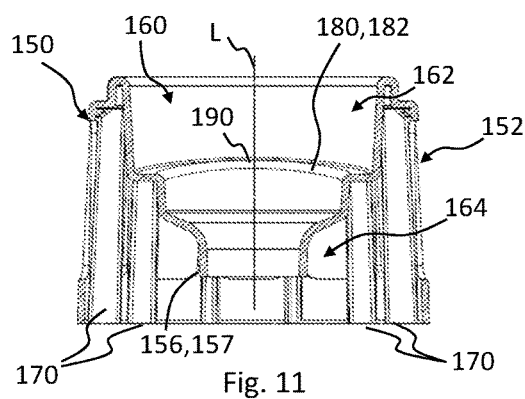
FIG. 11 shows a longitudinal cut view of the stand pipe according to FIG. 5 depicting a guiding surface inside a receptacle of the top region.
Figure 12:
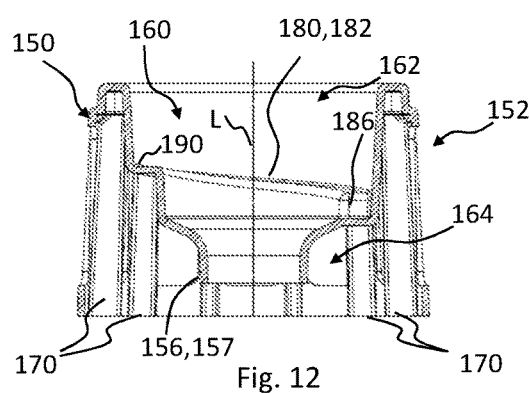
FIG. 12 shows a longitudinal cut view rotated by 90° about the longitudinal axis of the stand pipe according to FIG. 11 depicting a pocket in the guiding surface.
Figure 13:
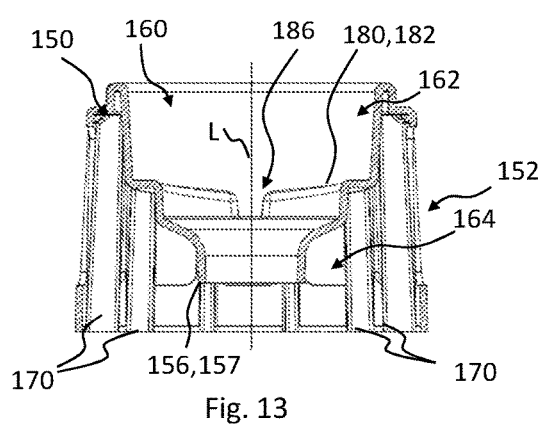
FIG. 13 shows a longitudinal cut view rotated by 180° about the longitudinal axis of the stand pipe according to FIG. 11 depicting a pocket in the guiding surface.
Figure 14:
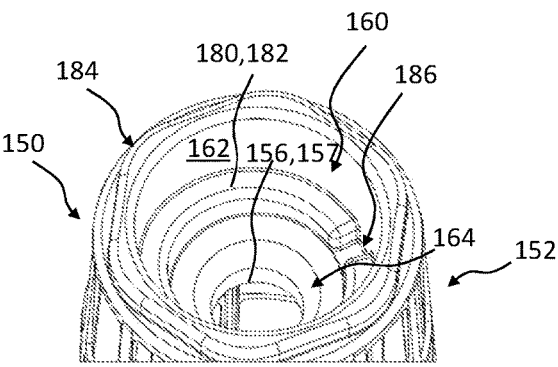
FIG. 14 shows an isometric top view of the top region of the stand pipe according to FIG. 11.

FIGS. 11 to 14 show a first embodiment of the stand pipe 150 which cooperates with the secondary filter element 10 with end cap 20 described in FIGS. 6 to 10. FIG. 11 shows a longitudinal cut view of the stand pipe 150, FIG. 12 shows a longitudinal cut view rotated by 90° about the longitudinal axis, FIG. 13 shows a longitudinal cut view rotated by 180° about the longitudinal axis, and FIG. 14 shows an isometric top view of the top region 164 of the stand pipe 150.

The stand pipe 150 provides a guiding surface 182 as self-positioning element 180 inside a receptacle 160 at the top region 152 of the stand pipe 150. The guiding surface 182 runs on the shell of the receptacle 160 and descents at both sides from a top axial position to a minimum axial position. Thus the guiding surface 182 can be described as comprising at least one preferably spiral ramp surface. Preferably, the guiding surface 182 comprises two ramp sections, both extending from a top position to the minimum axial position in counter rotating directions. As the guiding surface 182 extends in a radially inward direction, the projection element 32 can move on the guiding surface 182. In the minimum axial position a pocket 186 is preferably arranged which is intended to receive the projection element 32 of the secondary filter element 10 (FIGS. 6 to 10). The pocket 186 is preferably arranged diametrically opposite of the maximum point 190 of the guiding surface 182. That means the ramp sections preferably both end at the position of the pocket from opposite sides.

The contour of the receptacle 160 corresponds to the exterior contour of the endcap 20 of the secondary filter element 10. The receptacle 160 has an open ended bottom which ends in a connection element 156 for the connection elements 22 of the secondary filter element 10, i.e. the snap beams 23 can be hooked on the bottom of the receptacle 160 as locking element 157 provides a snap fit connection between the stand pipe 150 and the secondary filter element 10. The receptacle 160 is funnel shaped in its bottom region so that introducing the snap beams 23 is facilitated.

A ring is arranged at the surface of the top region 152 of the stand pipe 150 displaying a polygonal radial outer face. The polygonal contour 184 allows to mount the stand pipe 150 to the bottom wall 120 of the housing 110 (FIGS. 1, 2) in a position oriented manner. In particular, the longitudinal struts 170 can be arranged in well-defined rotational positions with respect to the bottom wall of the housing. In an air filter system for a combustion engine this allows to position the longitudinal struts 170 of the stand pipe 150 with respect to a mass flow sensor in a way that the flow characteristics of the fluid, i.e. air, is known in the region of the mass flow sensor and the measurements of the mass flow sensor are accurate. The mutual self-positioning elements 30, 180 of the secondary filter element and the stand pipe 150 enable a defined position of the longitudinal weld seam of the filter medium of the secondary filter element. As result a flow-disturbing influence of the longitudinal weld seam on the flow characteristics can be reduced or even eliminated.

In an embodiment not shown in a Figure, the contour 184 may be used as a self-positioning element for a position oriented positioning of the secondary filter element 10 on the stand pipe 150 (not shown in a Figure). With a hexagonal contour it is possible to position the secondary filter element 10 in six defined rotational positions on the stand pipe 150. In this case, the end cap 20 of the secondary filter element 10 is equipped with a form fitting corresponding contour.

Figure 15:
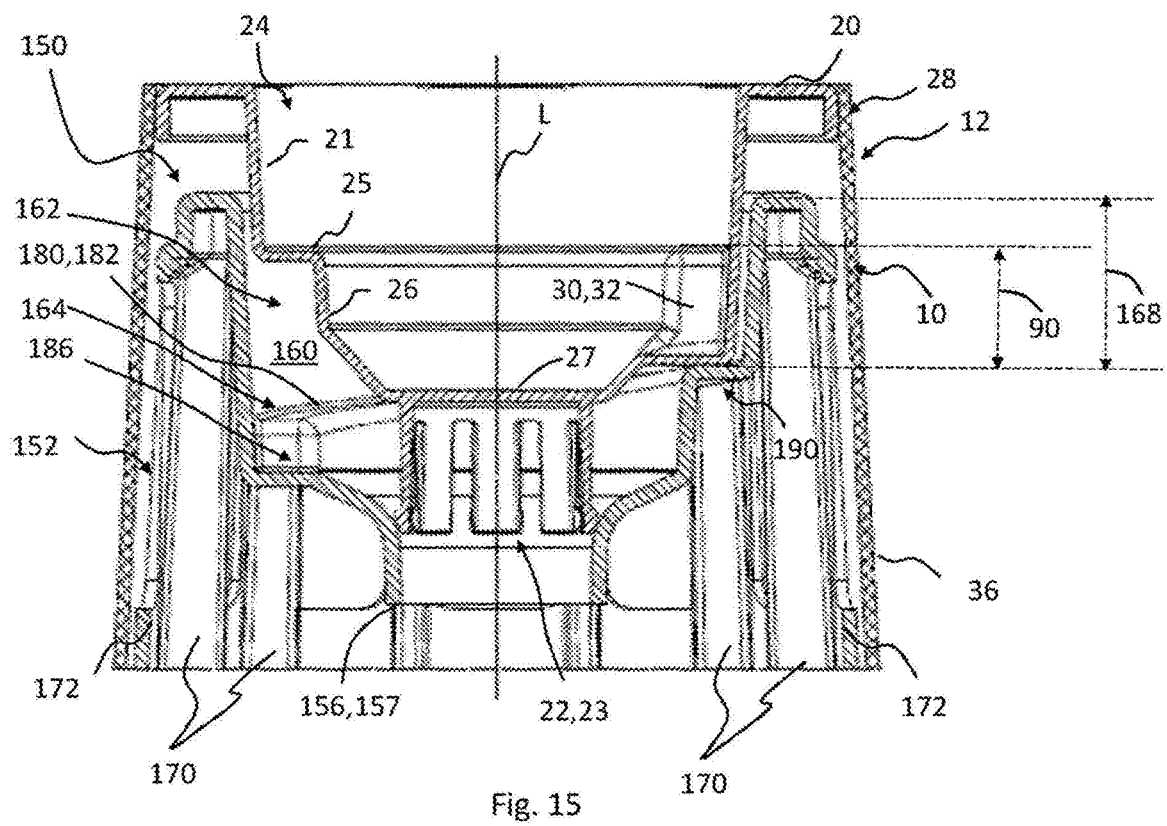
FIG. 15 shows a detailed view of the secondary filter element according to FIG. 3 and the stand pipe according to FIG. 5 making an initial contact during assembly.
Figure 16:
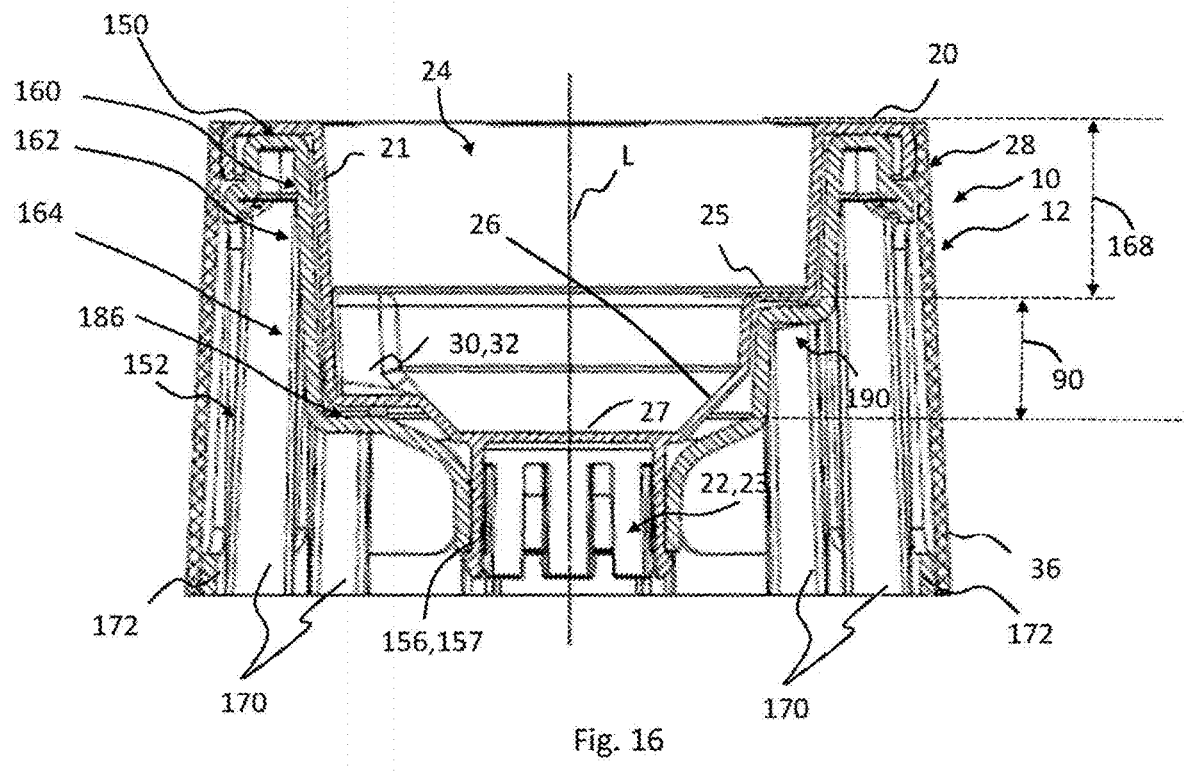
FIG. 16 shows a detailed view of the secondary filter element according to FIG. 3 and the stand pipe according to FIG. 5 with the secondary filter element in its final position after assembly with a projecting element of the end cap secured in a pocket of the receptacle of the stand pipe.

FIGS. 15 and 16 illustrate how the secondary filter element 10 according to the first embodiment in FIG. 3 is mounted to the stand pipe 150 in a self-positioning manner. FIG. 15 shows a detailed view of the secondary filter element 10 according to FIG. 3 and the stand pipe 150 according to FIG. 5 making an initial contact during assembly. FIG. 16 shows a detailed view of the secondary filter element 10 and the stand pipe according 150 with the secondary filter 10 in its final position after assembly with its projecting element 32 of the end cap 20 secured in the pocket 186 of the receptacle 160 of the stand pipe 150.

To mount the secondary filter element 10 onto the stand pipe 150, the body 36 of the secondary filter element 10 is put over and moved along the stand pipe 150 until the end cap 20 comes close the receptacle 160 of the stand pipe 150.

The end cap 20 enters the receptacle 160 towards the funnel-shaped bottom region of the receptacle 160 with the snap beams 23 first. The end cap 20 can be introduced into the receptacle 160 until the projection element 32 hits the guiding surface 182. The longitudinal extension 90 of the projection element 32 is smaller than the depth 168 of the top segment 162 of the receptacle 160. Thus, the upper segment 21 of the end cap can be immersed partly into the top segment 162 so that the step 25 is safely inside the receptacle 160. As a result, the end cap 20 can be guided further into the receptacle 160 safely without tilting.

The guiding surface 182 has one maximum point 190 in the bottom segment 164 of the receptacle 160 and is inclined on both sides of the maximum point 190. The maximum point 190 of the guiding surface 182 is at the interface between the top segment 162 and the bottom segment 164 of the receptacle 160. By turning the end cap 20 in either direction about the longitudinal axis L the end cap 20 moves further into the receptacle 160 because the projection element 32 is guided on the guiding surface 182 until the projection element 32 reaches the pocket 186 in the guiding surface 182.

The end cap 20 now is moved axially until the projection element 32 is accommodated in the pocket 186. As the snap beams 23 move axially downward, too, they can snap over the rim of the funnel shaped bottom segment 164. The rim is the locking element 157 of the stand pipe 150. The snap beams 23 lock the end cap 20 safely to the stand pipe 150. The end cap 20 may be removed from the stand pipe 150 by an opposite sequence of movement by pulling and turning the end cap 20.

For turning the end cap 20, a tool such as a handle or the like can be applied to the recess 24 of the end cap 20.

With the projection element 32 accommodated in the pocket 186, the secondary filter element 10 is positioned accurately in a well-defined rotational position with respect to the stand pipe 150. Hence, the longitudinal weld seam (not shown) is in a distinct position with respect to the longitudinal struts 170 of the stand pipe 150 and, consequently, to a mass flow sensor arranged at a fixed position close to the filter elements. Preferably, the hooks at the snap beams 23 are provided with inclined surfaces so that these can come loose when some force is applied to the end cap 20.

The length of the end cap 20 with snap beams 23 is matched to the depth of the receptacle 160 so that the snap beams 23 come into contact with the rim, i.e. the locking element 157, of the funnel shaped end of the receptacle 160 with the projection element 32 reaching its end position in the pocket 186. The step 25 of the end cap 20 rests on the maximum point 190 of the guiding surface 182 in the receptacle 160.

FIGS. 17 to 21 illustrate a second embodiment of a secondary filter element 10 with a closed end cap 20 according to FIG. 4 in more detail.

Figure 17:
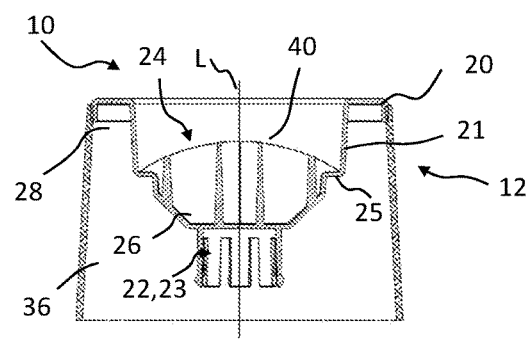
FIG. 17 shows a longitudinal cut view of a top region of the secondary filter element according to FIG. 4.
Figure 18:
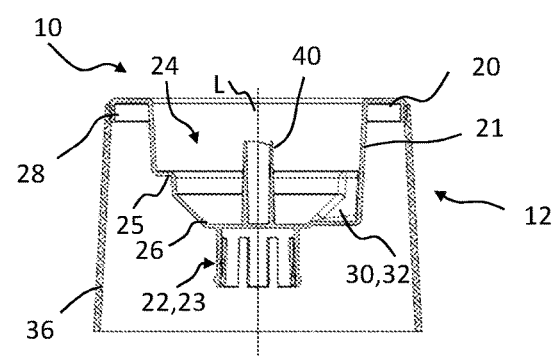
FIG. 18 shows another longitudinal cut view of the top region of the secondary filter element according to FIG. 4.
Figure 19:
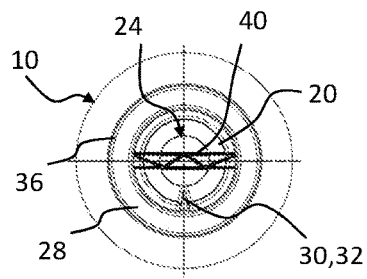
FIG. 19 shows a top view of the secondary filter element according to FIG. 4.
Figure 20:
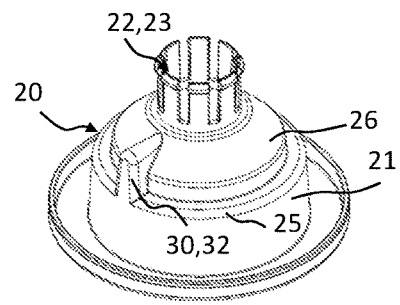
FIG. 20 shows an isometric view of the interior side of the end cap of the secondary filter element according to FIG. 4.
Figure 21:
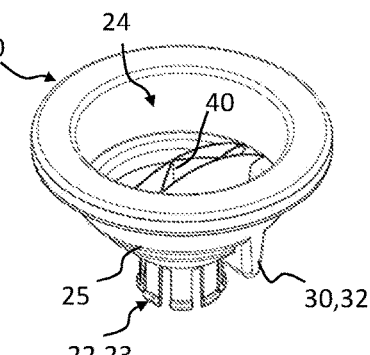
FIG. 21 shows an isometric view of the exterior side of the end cap of the secondary filter element according to FIG. 4.

FIGS. 17 to 19 show a top region 12 of the secondary filter element with the end cap 20 in different views where FIG. 17 shows a longitudinal cut view, FIG. 18 shows a longitudinal cut view of the top region 12 rotated by 90° about the longitudinal direction and FIG. 19 shows a top view of the secondary filter element 10. FIG. 20 shows an isometric view of the interior side of the end cap 20 of the secondary filter element 10 and FIG. 21 shows an isometric view of the exterior side of the end cap 20.

The features are virtually the same as of the secondary filter element 10 of the first embodiment. Reference is made to the description of the first embodiment in this regard.

Other than in the first embodiment, the end cap 20 comprises a bridge-like knob 40 in its recess 24. The knob 40 facilitates turning and manipulating the secondary filter element 10 during mounting to and removing from the stand pipe 150. An additional tool for manipulating the secondary filter element 10 is not necessary.

For better stability of the knob 40 in the recess 24, the tapered region in the bottom segment 26 of the recess 24 has a larger longitudinal extension compared to the tapered region in the first embodiment of the secondary filter element 10.

FIGS. 22 to 25 show a second embodiment of the stand pipe 150, similar the stand pipe in FIG. 5, which cooperates with the secondary filter element 10 with end cap 20 described in FIGS. 17 to 19.

Figure 22:
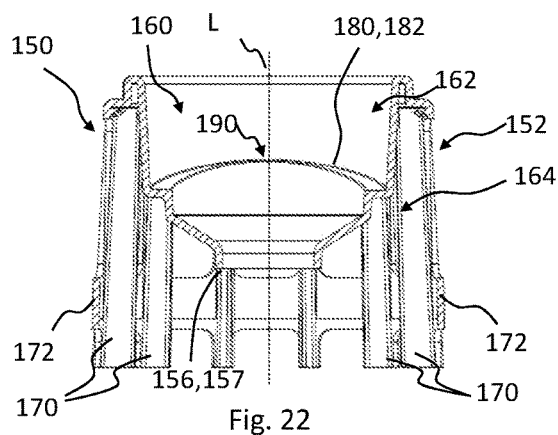
FIG. 22 shows a longitudinal cut view of a stand pipe similar to FIG. 5 depicting a guiding surface inside a receptacle of the top region.
Figure 23:
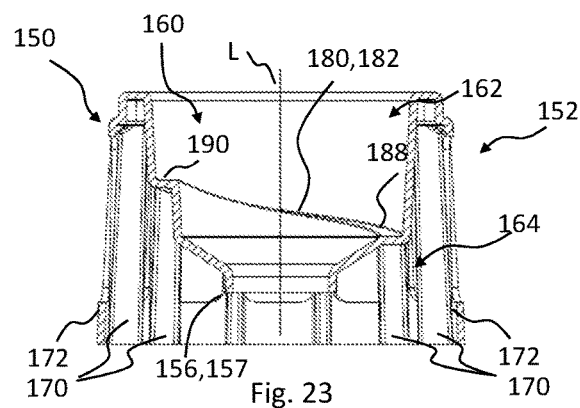
FIG. 23 shows a longitudinal cut view rotated by 90° about the longitudinal axis of the stand pipe according to FIG. 22 depicting a notch in the guiding surface.
Figure 24:
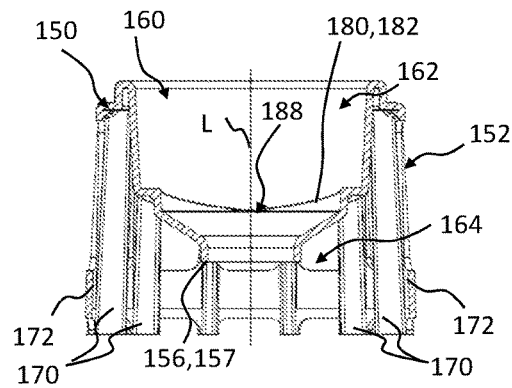
FIG. 24 shows a longitudinal cut view rotated by 180° about the longitudinal axis of the stand pipe according to FIG. 22 depicting a notch in the guiding surface.
Figure 25:
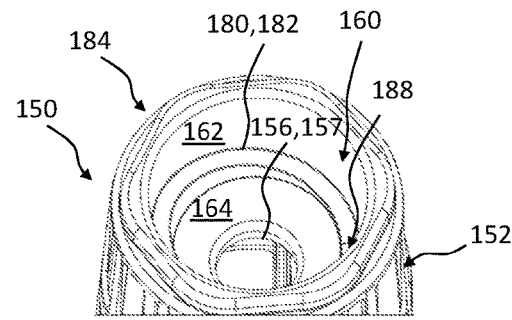
FIG. 25 shows an isometric top view of the top region of a stand pipe according to FIG. 22.

FIG. 22 shows a longitudinal cut view of the stand pipe 150 depicting a guiding surface 182 inside a receptacle 160 of the top region 152 of the stand pipe 150. FIG. 23 shows a longitudinal cut view rotated by 90° about the longitudinal axis L of the stand pipe 150 and FIG. 24 shows a longitudinal cut view rotated by 180° about the longitudinal axis L. FIG. 25 shows an isometric top view of the top region 152 the stand pipe 150.

The features are virtually the same as in the first embodiment of the stand pipe 150. Reference is made to the description of the first embodiment in this regard.

Other than in the first embodiment, the receptacle 160 of the stand pipe 150 comprises a guiding surface displaying a notch 188 instead of a pocket 186. The notch 188 in this case is a broad structure in the guiding surface 182 created at the interface of the two branches of the guiding surface 182 sloping down from the maximum point 190 of the guiding surface 182. The notch 188 is located diametrically opposite of the maximum point 190 of the guiding surface 182.

Figure 26:
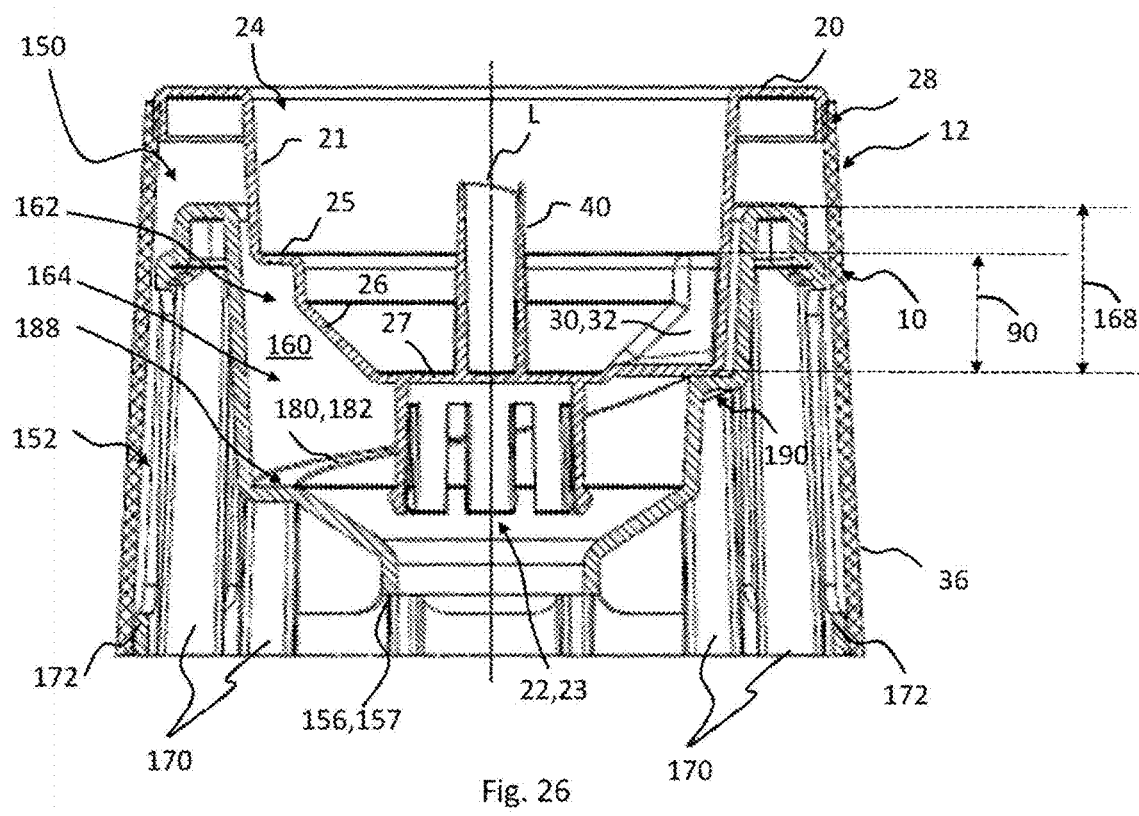
FIG. 26 shows a detailed view of the secondary filter element according to FIG. 4 and the stand pipe according to FIG. 22 making an initial contact during assembly.
Figure 27:
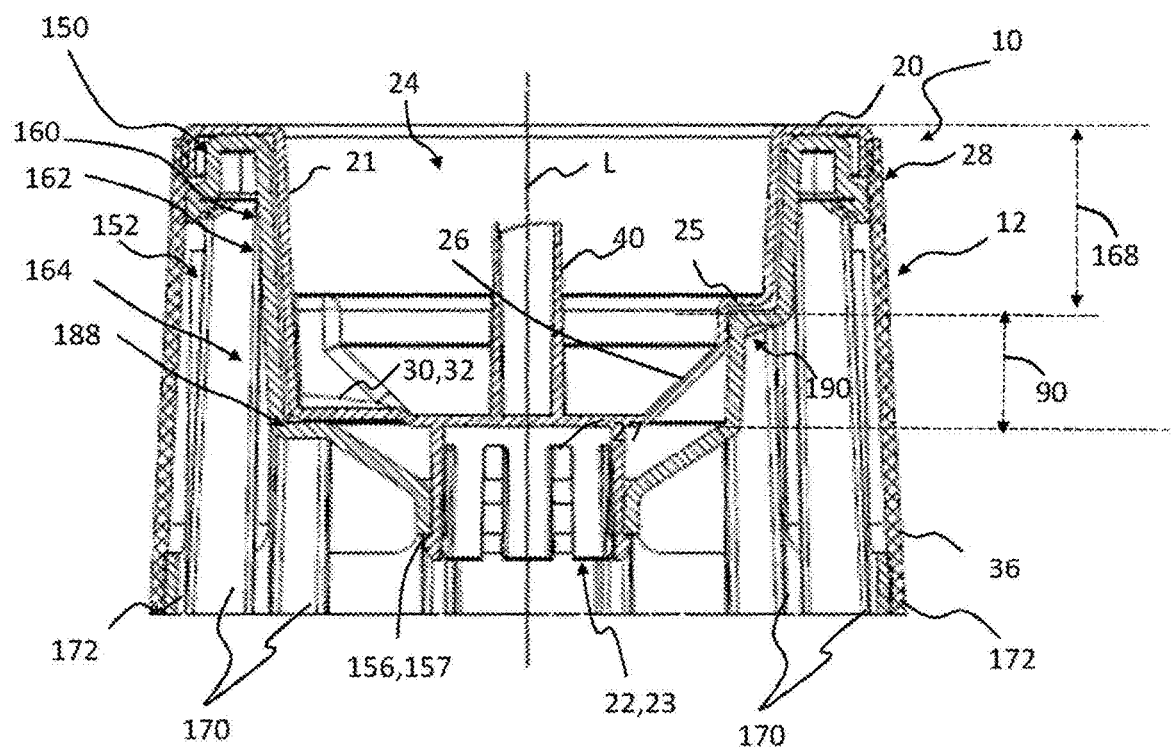
FIG. 27 shows a detailed view of the secondary filter element according to FIG. 4 and the stand pipe according to FIG. 22 with the secondary filter element in its final position after assembly with a projecting element of the end cap secured in a notch of the receptacle of the stand pipe.

FIGS. 26 and 27 show how the secondary filter element 10 is arranged on the stand pipe 150. The bridge-like nob 40 facilitates to remove the secondary filter element 10 from the stand pipe 150, as illustrated in FIGS. 26 and 27. By turning the end cap 20 and thus the secondary filter element about the axis L, the projecting element 32 moves down the receptacle 160 by gliding along the guiding surface 182. With arriving at the notch 188, the snap beams 23 hook on the rim of the funnel-shaped bottom segment 164 of the receptacle 160 as the rim is the locking element 157 for the snap beams 23. The step 25 of the end cap 20 rests on the maximum point 190 of the guiding surface 182 in the receptacle 160.

What is claimed is:
1. A filter system comprising
a housing,
a fluid inlet formed in a housing wall,
a fluid outlet formed in a housing wall,
a primary filter element and a secondary filter element, both being accommodated in the housing,
wherein the secondary filter element is arranged downstream the primary filter element on a stand pipe, a first axial end of the stand pipe being rigidly connected to one of the housing walls, the inside of the stand pipe being in fluid connection with the fluid outlet, a top region of the stand pipe positioned axially opposite the first axial end and comprising one or more connection elements configured to connect to connection elements of the secondary filter element,
wherein the secondary filter element comprises
a filter medium forming a body having at least one longitudinal seam along a longitudinal axis,
wherein the secondary filter element comprises
an end cap at its top region,
wherein the end cap is provided with one or more connection elements configured to connect to the stand pipe connection elements,
wherein the secondary filter element and the stand pipe are mutually connected by the connection elements, and wherein the end cap of the secondary filter element and the stand pipe are configured with mutual self-positioning elements to arrange the secondary filter element on the stand pipe in a defined rotational position with respect to one or more struts of the stand pipe.

2. The filter system according to claim 1, wherein
the mutual self-positioning elements comprise
a guiding surface and
a projection element,
wherein the guiding surface is intended to guide the projection element from an initial position to a final position where the secondary filter element is in its defined rotational position with respect to the one or more struts of the stand pipe.

3. The filter system according to claim 1, wherein
the mutual self-positioning elements comprise
a contour arranged at an exterior surface of one of the stand pipe and the secondary filter element and a counter contour at an interior surface of the other one of the stand pipe and the secondary filter element.

4. The filter system according to claim 1, wherein
the top region of the stand pipe comprises
a receptacle for accommodating the end cap of the secondary filter element, the receptacle having a bottom segment and a top segment along the longitudinal axis.

5. The filter system according to claim 1, wherein
the end cap of the secondary filter element is configured with a recess configured to extend into the interior of the stand pipe where the recess extends inside the receptacle towards the bottom segment.

6. The filter system according to claim 4, wherein
the bottom segment provides at least one mutual self-positioning element and
the top segment is free of the at least one mutual self-positioning element.

7. The filter system according to claim 4, wherein
the top segment of the receptacle has a depth in the receptacle which is equal to or larger than a longitudinal clearance of the longitudinal outermost face of the projection element.

8. The filter system according to claim 1, wherein the connection elements for connecting the secondary filter element and the stand pipe comprise snap-fit elements comprising one or more snap beams and one or more locking elements for the snap beams.

9. The filter system according to claim 8, wherein
a length of the snap beams is adjusted to a longitudinal extension of the receptacle so that the connection elements of the secondary filter element and the stand pipe connect when or after the projection element has reached its final position.

10. The filter system according to claim 2, wherein a pocket is arranged in the guiding surface configured to receive the projection element when the secondary filter element is in or close to its final position.

11. The filter system according to claim 2, wherein
a notch is arranged in the guiding surface for receiving the projection element when the secondary filter element is in its final position.

12. A secondary filter element for a filter system according to claim 1, comprising
a filter medium forming a body with at least one longitudinal, weld seam, along a longitudinal axis (L) and an end cap at its top region,
wherein the end cap is a pot-shaped end cap, comprising:
an annular upper segment surrounding the longitudinal axis (L); and carrying the filter medium;
an annular bottom segment surrounding the longitudinal axis (L) and spaced radially inwardly away from the annular upper segment;
wherein the annular bottom segment has a smaller diameter than the annular upper segment,
an annular step segment forming a radially projecting wall closing an annular gap between the annular upper segment and the annular bottom segment, the annular step segment connected along a radial inner circumference to the annular bottom segment and connected along a radial outer circumference to the annular upper segment;
wherein the end cap is provided with connection elements formed as axially projecting snap beams which are configured to connect the secondary filter element to a stand pipe of the filter system, and
a self-positioning projection arranged on the annular step segment and projecting in an axial direction along a radially outer side of the annular bottom segment;
wherein the self-positioning projection is configured to to arrange the secondary filter element on the stand pipe of the filter system in a defined rotational position with respect to one or more struts of the stand pipe of the filter system.

13. The secondary filter element according to claim 12, wherein
the self-positioning projection extends into the interior of the secondary filter medium.

14. The secondary filter element according to claim 12, wherein
the self-positioning projection is arranged eccentrically on the end cap with respect to a center axis of the end cap.

* * * * *